Figure 1:
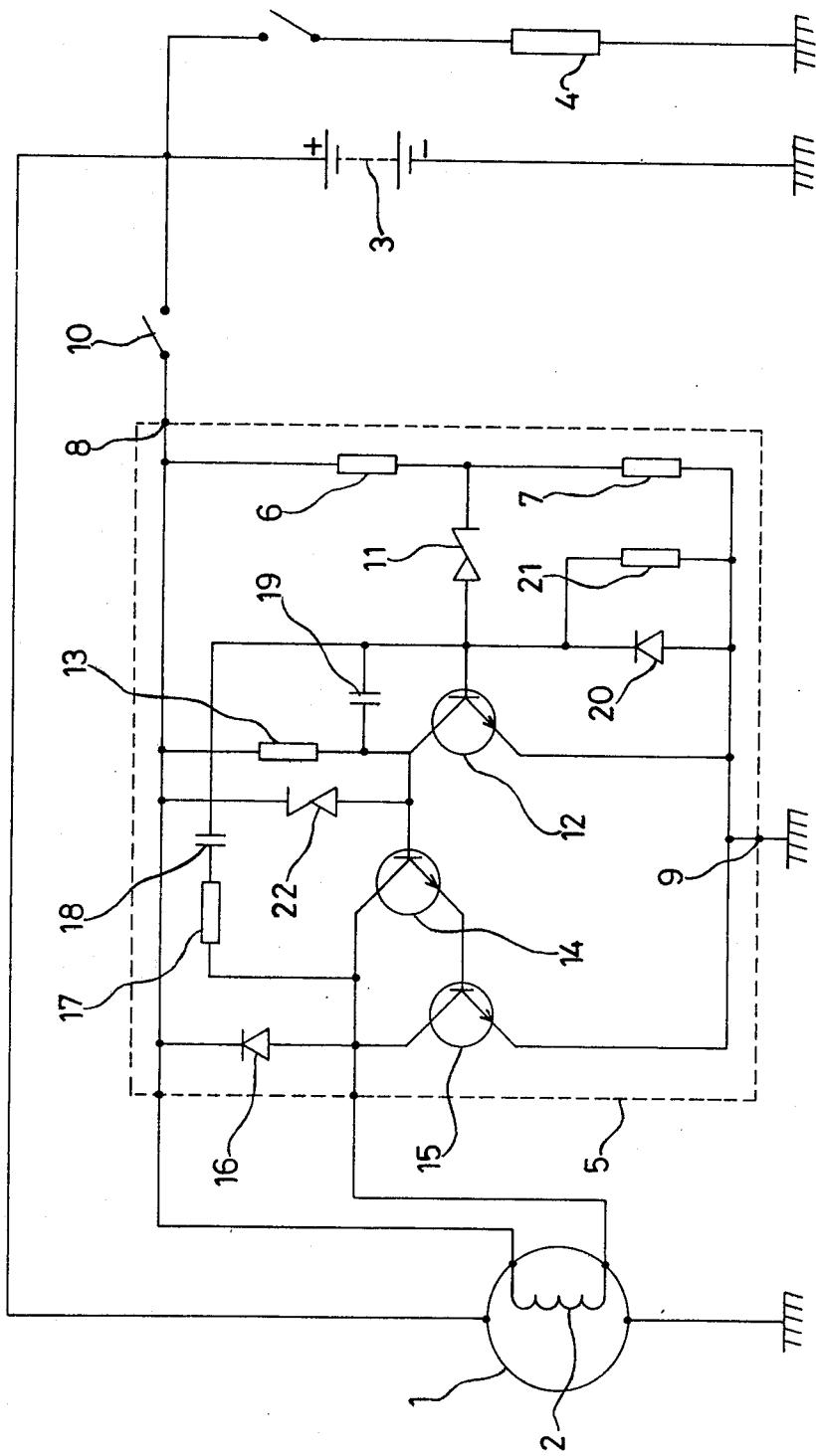

United States Patent [19]

Gruson

[11] 4,040,115
[45] Aug. 2, 1977

[54] SEMI-CONDUCTOR REGULATORS, PARTICULARLY FOR MOTOR VEHICLE GENERATORS

[75] Inventor: Michel Gerard Gruson, Paris, France

[73] Assignee: Ducellier et Cie., Paris, France

[21] Appl. No.: 633,296

[22] Filed: Nov. 19, 1975

[30] Foreign Application Priority Data

Dec. 27, 1974 France .................................. 74.42949

[51] Int. Cl.[2] ............................................. H02H 9/04
[52] U.S. Cl. ......................................... 361/18; 322/28
[58] Field of Search ............... 317/33 VR, 50; 322/28

[56] References Cited

U.S. PATENT DOCUMENTS

| 3,488,560 | 1/1970 | Konopa | 317/50 X |
| 3,723,817 | 3/1973 | Leonard et al. | 317/50 X |

*Primary Examiner*—Harry E. Moose, Jr.

[57] ABSTRACT

A voltage regulator for a vehicle battery charging system includes a Darlington pair for controlling the switching of current through the field winding of a generator. The input transistor of the Darlington pair has its base connected to one input terminal of the regulator by a normally non-conductive Zener diode of breakdown voltage at least five times the nominal voltage of the system, to protect the Darlington pair against over-voltage transients.

4 Claims, 2 Drawing Figures

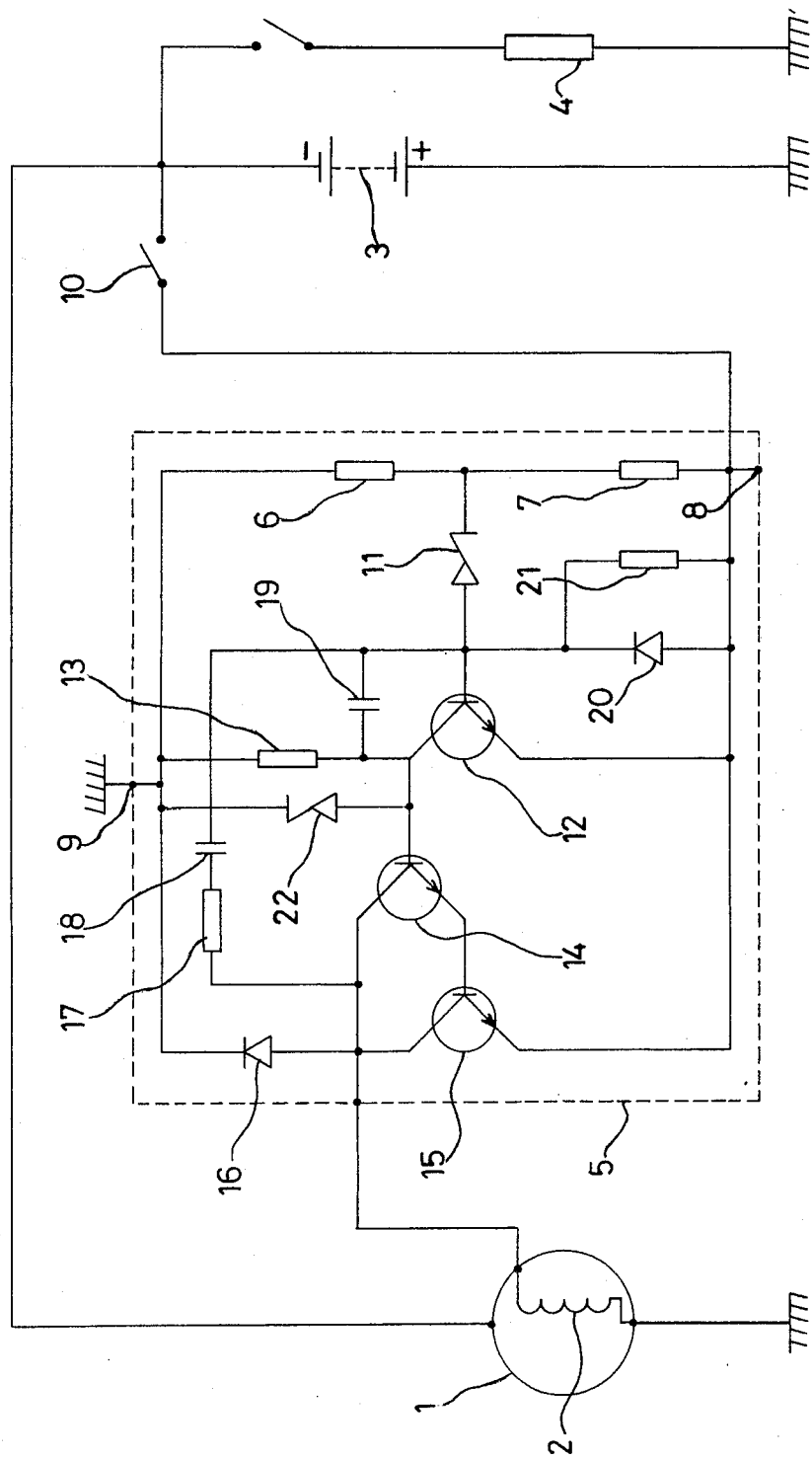
_FIG. 2_

SEMI-CONDUCTOR REGULATORS, PARTICULARLY FOR MOTOR VEHICLE GENERATORS

The present invention concerns semi-conductor regulators and more especially regulators of which the output stage is constituted by a Darlington pair, such as are employed in the electrical equipment of motor vehicles, such equipment comprising particularly an accumulator battery and an alternator which charges the battery.

The principle of operation of such regulators is well known and can be summarised as follows: The regulator is connected to the field winding of the alternator and controls the voltage between the positive pole and the negative pole of the installation. This voltage appears across a bridge divider constituted by resistances and a Zener diode is connected between the mid-point of this bridge divider and the base of a transistor for controlling the Darlington pair.

If the voltage detected across the terminals of the battery, by means of the bridge divider, is less than the predetermined value of conduction of the Zener diode, the control transistor remains in a non-conducting state. In this case and by means of a resistance connected between the positive pole and the input of the Darlington pair, the latter becomes conductive and current flows in the field winding of the alternator and this creates an increase in voltage.

As soon as this increase in voltage due to the increasing excitation of the alternator attains the predetermined conduction value of the Zener diode, the latter conducts and the base of the control transistor is biased. This transistor becomes conducting, a current flows between its collector and its emitter and consequently renders the Darlington pair non-conductive.

Since the field winding is no longer supplied, the voltage at the terminals of the alternator and consequently across the battery decreases until it attains the threshold of non-conduction of the Zener diode and the cycle described above re-commences. The control transistor and the Darlington pair function as a flip-flop and the regulating voltage is obtained by adjustment of the values of the resistances of the bridge divider.

It is known that in the majority of existing motor vehicle electrical equipment, transient over-voltages of high value appear under certain conditions of use.

The energy developed by these over-voltages is considerable and the semi-conductor devices connected to the supply line can be seriously damaged and it is known from experience that, for over-voltages greater than 100 volts, there is a risk for the majority of the Darlington pairs employed as output stages in known semi-conductor regulators.

Regulators of the aforesaid type are known which employ a protection by a Zener diode against transient over-voltages. In these arrangements, this Zener diode is connected either to the output of the regulator and directly to the positive pole or the negative pole of the installation, or, and in this case by means of a resistance, between the supply terminal of the regulator and the base of the input stage of the Darlington pair.

In the first case, clearly the Zener diode is necessarily a power diode in order to be able to dissipate, without risk of destruction, about 100 watts for an installation of normal 12 volt value, the result being high cost and the necessity for an assembly on a dissipating surface, which is not always compatible with the size of the regulator which thus leads to an external assembly.

In the second case, if the resistance placed in series with the Zener diode is of small value, the conduction threshold of the Zener diode being chosen of lower value, that is to say about 15 to 20 volts, the inverse current from the over voltage of high value will be of high value, resulting in the destruction of the Zener diode if this is not a power diode.

By contrast, if the resistance is of high value and this, in order to avoid using a power Zener diode, is expensive, the sum of the voltages $U_z + U_R$ will be excessive and the Darlington pair will be damaged.

The invention has for an object to remedy these disadvantages and concerns to this effect a semi-conductor regulator employing a Darlington pair output stage and protection of the Darlington pair by a Zener diode, characterised in that the Zener diode is connected directly between the base of the input transistor of the Darlington pair and one supply terminal of the regulator, said diode having a conduction threshold of value equal to at least five times the nominal voltage value of the installation, such that the dynamic value of its inverse resistance will be sufficiently great to ensure the protection of the Darlington pair against transient over-voltages.

The description which follows with reference to the attached drawings will facilitate better understanding of how the invention can be carried out.

FIGS. 1 and 2 represent electrical diagrams of two different preferred embodiments of installation for regulating the charge of a battery from an alternator, according to the invention.

The drawings show an alternator 1 excited by a field winding 2.

The armature winding and the rectifying device (not shown in the drawings) of the alternator 1 are connected to an accumulator battery 3 supplying a group of inductive or purely resistive elements represented by the resistance 4.

A regulator 5, of semi-conductors, controls the excitation of the alternator 1.

In known manner, the regulator 5 comprises a voltage bridge divider composed of resistances 6 and 7 connected between the supply terminal 8 of the regulator and the terminal 9 which is the earthing terminal of the regulator.

A switch 10, which may advantageously be the ignition switch, is disposed between the terminal 8 and the battery 3.

A Zener diode 11 is connected between the mid-point of the bridge divider and the base of a control transistor 12 of which the collector is connected to the terminal 8 by means of a limiting resistance 13 and the emitter to the terminal 9.

The collector of the n-p-n transistor 12 is also connected to the base of the n-p-n transistor 14 which is connected to the n-p-n transistor 15 according to the Darlington arrangement.

A diode 16, connected in parallel to the field winding 2, absorbs the discharge current of the inductance of the field winding when the excitation current ceases.

A first feedback circuit composed of a resistance 17 and a condensor 18 in series between the collectors of transistors 14, 15 and the base of transistor 12 and a second circuit composed of a condensor 19 between the collector and base of the transistor 12 improve the switching of the transistors and in consequence diminish the heating.

A diode 20 protects the transistor 12 against over voltages. A resistance 21 ensures the thermal stabilisation of the transistor 12.

A Zener diode 22 is connected between the base of the transistor 14 and the supply terminal of the regulator (see FIG. 1) or the base of the transistor 14 and the earth terminal of the regulator (see FIG. 2) according to whether the field winding 2 has its two ends isolated (see FIG. 1) or one of them connected directly to earth by means of the alternator (see FIG. 2).

The Zener diode 22 has a conduction threshold of a value at least equal to five times the value of the nominal voltage of the installation, that is to say that for an installation of nominal value 12 volts, the conduction threshold must not be less than 60 volts. The choice of such a value is conditioned by the fact that it is necessary for the dynamic value of its inverse resistance to be sufficiently high in order to avoid, on the one hand the destruction of the diode by too large an inverse current, and on the other hand limiting the base current of the Darlington pair when conducting under the effect of the Zener diode 22 in order to avoid its destruction.

If the transient over-voltages, due to inductive equipment, are of a level less than the conduction threshold of the Zener diode 22, the latter remains non-conducting and the regulator functions normally. By contrast, if the transient over-voltages are greater, the Zener diode 22 becomes conducting and consequently renders conducting the Darlington pair and the over-voltage is shunted to earth by means of the inductor 2.

The embodiment shown in FIG. 2 differs essentially from that shown in FIG. 1 in that the positive pole of the accumulator battery 3 is connected to the earth of the installation and in that the fielding winding 2 has one of its ends connected to earth by means of the alternator 1.

It is well understood that modifications can be made to the embodiments described above without departing from the scope of the invention, modifications such as, for example, the replacement of the n-p-n transistors by p-n-p transistors in the case of an installation with a battery having its negative pole connected to earth and one of the ends of the field winding connected to earth by means of the alternator or in the case of an installation with the positive pole of the battery connected to earth and a field winding having its two ends isolated.

I claim:

1. An improvement to semi-conductor regulators, particularly for motor vehicle generators, the regulators comprising an output stage constituted by a Darlington pair and protection by a Zener diode, characterised in that the Zener diode is connected directly between the base of the input transistor of the Darlington pair and the supply terminal of the regulator, the said diode has a conduction threshold of value equal to at least five times the nominal value of voltage of the installation, such that the dynamic value of its inverse resistance is sufficiently high to ensure the protection of the Darlington pair against transient over-voltages.

2. An improvement to semi-conductor regulators, notably for motor vehicle generators, the regulators comprising an output stage constituted by a Darlington pair and protection by a Zener diode, characterised in that the Zener diode is connected directly between the base of the input transistor of the Darlington pair and the earth terminal of the regulator, the said diode has conduction threshold of value equal to at least five times the nominal voltage value of the installation, such that the dynamic value of its inverse resistance is sufficiently high to ensure the protection of the Darlington pair against transient over-voltages.

3. A battery charging system for a road vehicle comprising a generator having output terminals across which the battery is connected and a field winding the current in which determines the output voltage, a voltage regulator comprising battery-voltage sensing means connected to control the input transistors of a Darlington pair controlling the current flow through the field winding whereby the Darlington pair is switched on when the battery voltage is below and off when the battery voltage is above a predetermined voltage, with the improvement that a protective Zener diode is connected directly between the base of the input transistor of the Darlington pair and one of said output terminals, the Zener diode having a threshold voltage at least five times said predetermined voltage, such that the value of its inverse resistance is sufficiently high to ensure the protection of the Darlington pair against transient over-voltages.

4. A system as claimed in claim 3 in which said Darlington pair consists of n-p-n transistors and the Zener diode has its anode connected to the base of the input transistor and its cathode connected to the positive output terminal.

* * * * *